United States Patent [19]
Kruger

[11] 3,932,215
[45] Jan. 13, 1976

[54] VERTICAL CONTROL ROD FOR RAPID AND SAFE SHUT-OFF OF NUCLEAR REACTORS

[75] Inventor: Horst Krüger, Bensberg-Herkenrath, Germany

[73] Assignee: Interatom Internationale Atomreaktorbau GmbH, Bensberg, Cologne, Germany

[22] Filed: Mar. 14, 1973

[21] Appl. No.: 341,278

Related U.S. Application Data

[63] Continuation-in-part of Ser. No. 201,579, Nov. 26, 1971, abandoned.

[30] Foreign Application Priority Data

Nov. 28, 1970 Germany............................ 2058619

[52] U.S. Cl............................. 176/36 R; 176/86 R
[51] Int. Cl.............................................. G21c 7/12
[58] Field of Search..... 176/36 R, 36 S, 36 L, 36 C, 176/86 R

[56] References Cited

UNITED STATES PATENTS

| | | | |
|---|---|---|---|
| 3,089,838 | 5/1963 | Paget | 176/86 R |
| 3,197,378 | 7/1965 | Fortescue | 176/36 R |
| 3,515,639 | 6/1970 | Pflugrad | 176/36 R |
| 3,720,580 | 3/1973 | Schubert et al. | 176/36 R |
| 3,762,994 | 10/1973 | Kunzel | 176/36 S |

FOREIGN PATENTS OR APPLICATIONS

| | | | |
|---|---|---|---|
| 1,475,017 | 2/1967 | France | 176/86 R |

*Primary Examiner*—Harvey E. Behrend
*Attorney, Agent, or Firm*—Herbert L. Lerner

[57] ABSTRACT

Vertical control rod includes an absorber formed of flexible members and suspended by a traction device below the reactor core during operation of the reactor and a tensional spring for drawing the absorber into the reactor core to shut off the reactor. The control rod is operable independently of gravity and avoids jamming of the absorber in the guide therefor.

4 Claims, 8 Drawing Figures

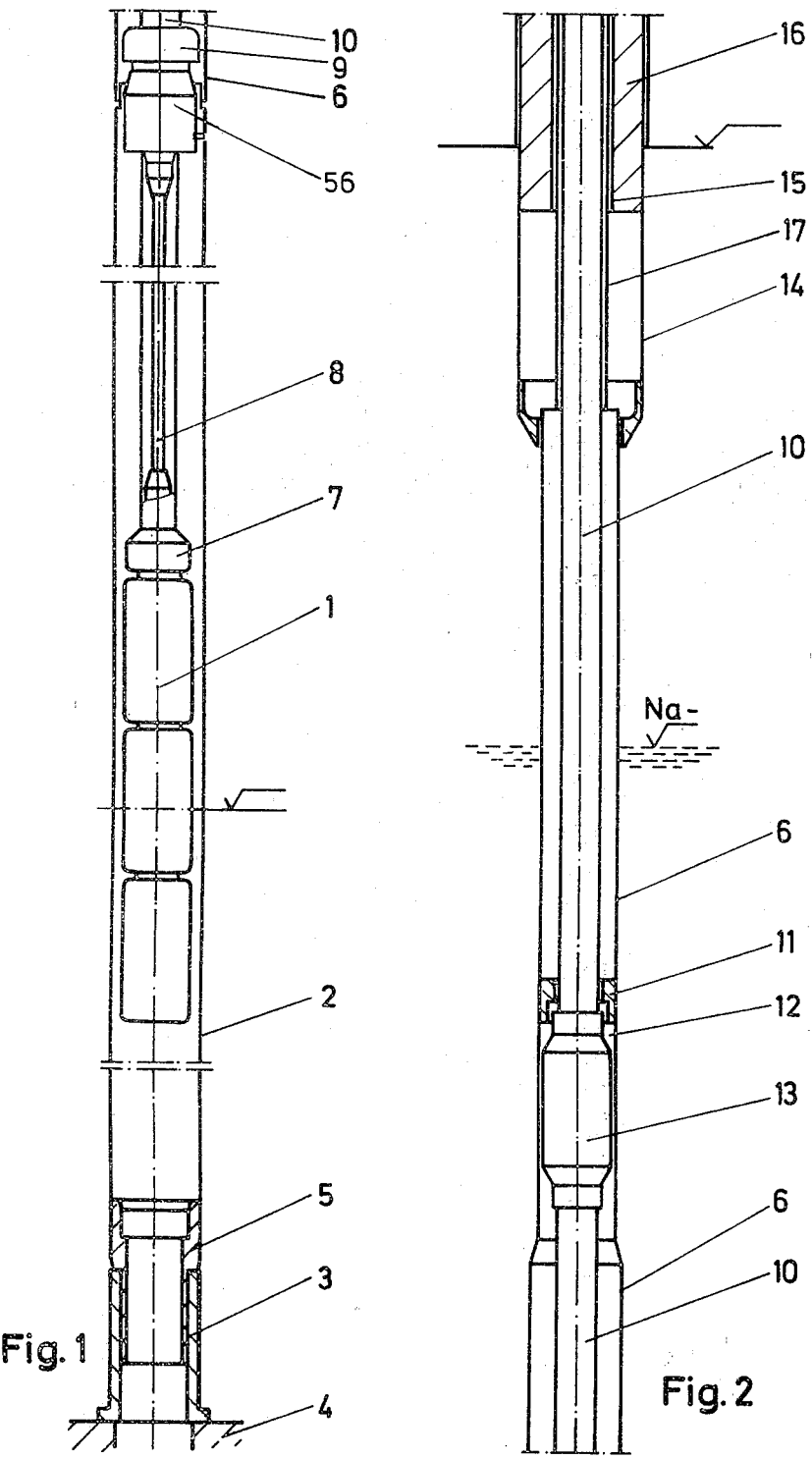

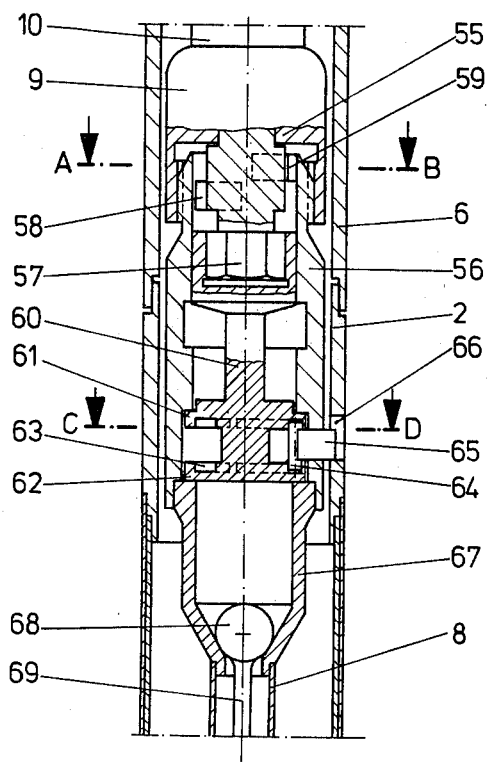
Fig. 5
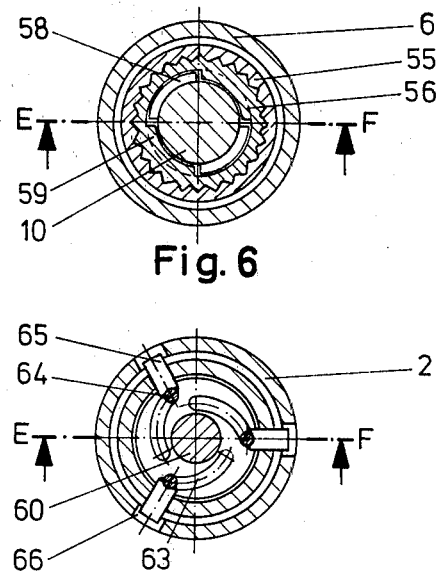
Fig. 6
Fig. 7
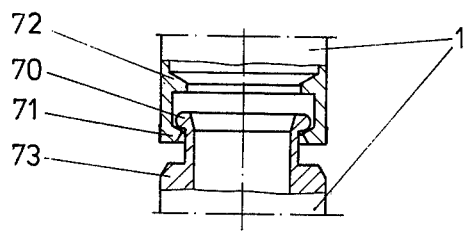
Fig. 8

VERTICAL CONTROL ROD FOR RAPID AND SAFE SHUT-OFF OF NUCLEAR REACTORS

This is a continuation-in-part application of prior application Ser. No. 201,579 filed Nov. 26, 1971, now abandoned.

The invention relates to a vertical control rod for shutting off nuclear reactors rapidly and safely. More particularly, the control rod is of the type that is removable from the reactor in an upward direction, and is formed of a flexible absorber guided in a tube, an acceleration spring, a drive mechanism for tensioning the spring, and a holding device for the spring. Flexible absorbers are employed to avoid dangerous jamming of the absorbers in the guide therefor, particularly in the case of very long control rods and are known, for example, from German Pat. Nos. 1,092,572 and 1,100,831. In these and other shut-off devices, the flexible absorbers are suspended from a holding device above the reactor core during the operation of the reactor and are dropped into the reactor core, accelerated by gravity in order to shut off the reactor. Shut-off devices of this kind are very reliable, but the shut-off speed thereof and the forces available for overcoming resistances are limited. Any additional force acting upon the suspended, flexible absorbers from above and exceeding the force of gravity, however, increases the danger of jamming in the guide.

It is accordingly an object of the present invention to provide a vertical control rod for rapidly and safely shutting off a nuclear reactor which is removable from the reactor in an upward direction, and has a force available for effecting shut-off which exceeds the force of gravity, yet avoids jamming of the absorber in the guide therefor, even when, in the event of damage, deformation of the guide tube might result.

With the foregoing and other objects in view, there is provided, in accordance with the invention, vertical control rod for rapidly and safely shutting off a nuclear reactor, the rod being removable from a reactor in upward direction and comprising an elongated tube, a flexible absorber guided in the tube, spring means operatively connected to the absorber for accelerating vertical displacement thereof, a drive mechanism for tensioning the spring, means for holding the spring, a traction device suspending the absorber below the core of the reactor during operation of the reactor and means for disposing the accelerating spring means and the drive mechanism above the reactor core. The flexible absorber is thereby stressed only in tension and jamming thereof in the guide is thereby avoided.

In accordance with a further feature of the invention, the absorber is disconnectible from the traction device therefor, and the drive mechanism above the reactor core, while being simultaneously lockable into its shut-off position. Thus, the entire control rod, except for the absorber part, is exchangeable without impairing the shut-off action.

In accordance with another feature of the invention, the absorber is moveable into shut-off position by means of the drive mechanism for tensioning the acceleration spring. While sacrificing shut-off speed, a result of this construction is that the absorber is moved, with greater reliability, into the shut-off position if the acceleration spring should fail. It is also advantageous so to control the drive mechanism that it follows the absorber into the shut-off position immediately after the shut-off is effected.

In accordance with yet another feature of the invention, the traction device has a hollow construction and contains a wire rope secured at both ends thereof. This construction affords an additional safety precaution and assures a strong connection between the absorber and the drive mechanism even if the traction device itself should break.

In accordance with an additional feature of the invention, the absorber is formed of several members that are movable with respect to each other and are guidable in a guide tube which is traversible by a coolant flow, the lowermost absorber being disposed, during the operation of the reactor in a lower end section of the guide tube, substantially sealing the spacing between the absorber and the inner surface of the guide tube from the outside. This construction has the advantage that, in the event of shut-off, the absorber is sufficiently cooled by a flow of coolant between the absorber and the inner surface of the guide tube but that, during the operation of the reactor, no appreciable or substantial quantities of coolant can flow through the guide tube which would contribute only little to the cooling of the reactor core.

FIGS. 1 to 4 are diagrammatic longitudinal sectional views of a control rod according to the invention in four sections extending progressively from the bottom to the top of the control rod, as disposed in shut-off position.

FIG. 5 is a sectional view on an enlarged scale taken along the lines E–F in FIGS. 6 and 7 and showing the bayonet coupling.

FIG. 6 is a sectional view taken along the lines A–B in FIG. 5.

FIG. 7 is a sectional taken along the lines E–F in FIG. 5.

FIG. 8 is a sectional view, on an enlarged scale, showing the flexible connection of the individual parts of the absorber.

Figure 3:
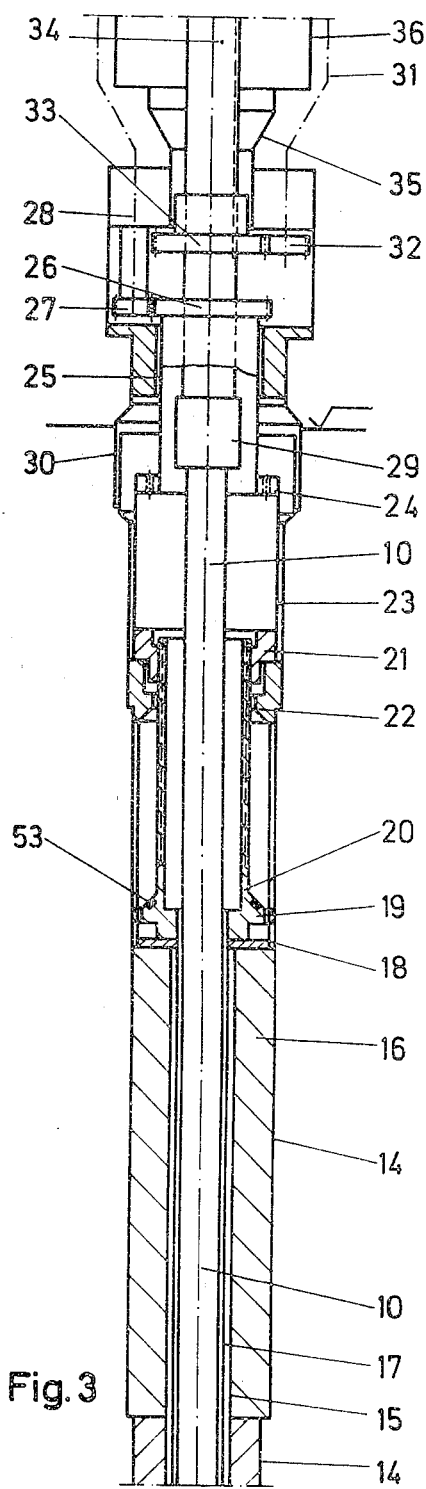

Referring now to the drawing and first, particularly, to FIG. 1 thereof, there is shown therein an absorber 1 formed of three members that is guided in a guide tube 2 which, at its lower end, is held in a sleeve 3 that is secured to the grid support plate 4. During operation of the reactor, the lower end of the absorber 1 rests in a correspondingly shaped end section 5 of the guide tube 2, sealing it, and thereby largely prevents coolant from entering the guide tube 2. The guide tube 2 is held at its upper end in a centering tube 6. The absorber 1 is connected through a connecting device 7, which need not be described in detail as it is not essential to the invention, to one end of a tie rod 8. The other end of the tie rod 8 is secured to the lower part of a bayonet coupling 9 of conventional construction. The latter, in turn, is connected with the upper part thereof to a connecting rod 10. When the connecting rod 10 is turned, it causes disengagement of the bayonet coupling 9, whereupon the entire device can be pulled up and only the parts 1 to 5, 7 and 8 of the control rod remain in the reactor in the shut-off position of the control rod.

In FIG. 2, the reduced-diameter centering tube 6 and guide bearing 11 form a dashpot 12 in which the connecting rod 10 displaces a damper piston 13 that is mounted thereon, thereby braking the motion of the absorber mechanism, when it is moved rapidly upwardly to the shut-off position shown, prior to reaching that final shut-off position. The centering tube 6 is mounted in a tube 14. Shielding 16 is disposed in the space between the inner surface of the tube 14 and the outer surface of a tube 15 disposed within and coaxially to the tube 14. The tube 15, in turn, surrounds a guide tube 17.

In FIG. 3, the tube 14 is seated with a shoulder thereof on the lid of the reactor. A cover 18 seated on the tube 15 closes off the shield 16 at the top thereof. A sleeve 20 connected to the tube 17 and provided with an external thread and a conical seal 19, is disposed on the cover 18. Upon rotating a tube 23 in which a nut 21 is disposed, the sleeve 20 is screwed into the nut 21 until a conical seal 19 comes to rest against a correspondingly shaped interior cone 22, so that gas is prevented from escaping from the reactor by a seal 53. At the same time, the centering tube 6 is lifted through the tube 17 for such a distance that a gap is formed at the junction between the centering tube 6 and the guide tube 2 (note FIG. 1), and it is thereby possible to rotate the reactor lid to carry out fuel element replacement operations. The tube 23 is connected through a gear coupling 24 with a sleeve 25 which, at the upper end thereof, is provided with a gear 26 that meshes with a pinion 27 mounted on a universal joint drive shaft 28. The gear coupling 24 is required so that, when a chuck 29 of conventional construction, is disengaged, the tube 23 can be separated from the housing 30 that is slid over it. The universal-joint shaft 28 with its pinion 27 are supported in the housing 30, as well as a universal-joint shaft 31 with a pinion 32 secured thereto, which engages a gear 33 mounted on a shaft 34 that is connected to the rod 10 through the chuck 29. When the chuck 29 is disengaged, the parts of the device which have been in contact with the coolant can be separated from the other parts. The chuck 29 also facilitates the installation or assembly of the device. The housing 30 is connected to a tube 36 through an intermediate section 35.

Figure 4:
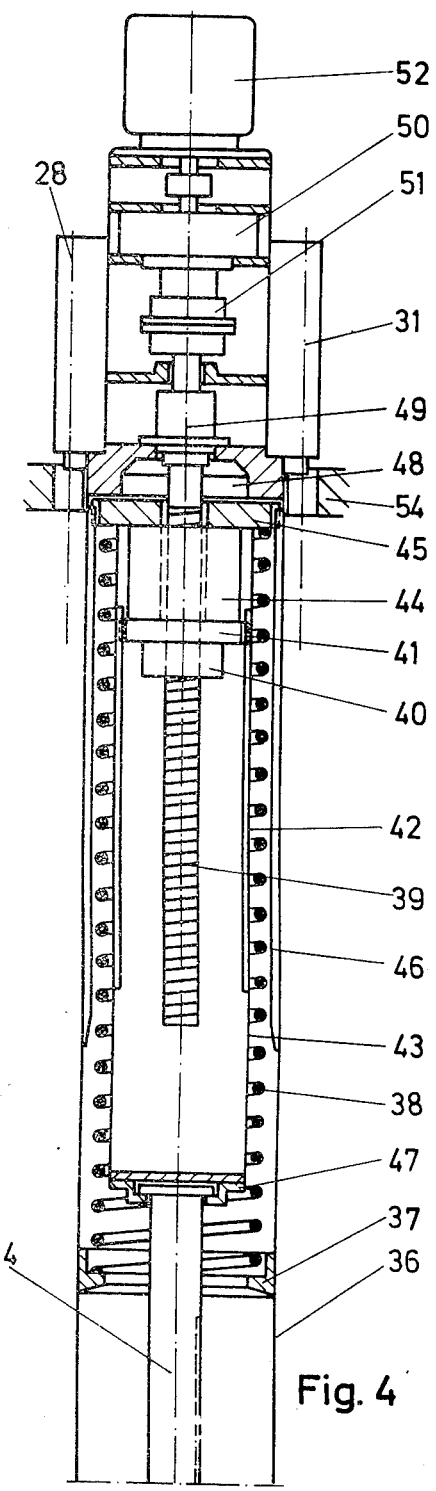

FIG. 4 shows the tube 36, in which a holding plate 37 is secured. A helical spring 38 bears against the holding plate 37. If a lead screw 39 is turned, the rotation thereof is transformed into axial motion by a nut 40, and a disc 41, which is rigidly connected to the nut 40 and is prevented from turning by a retaining slot 42 on the inside of a tube 43, slides downwardly. On the disc 41, there is secured a toroidal electromagnet 44, the leads of which are not illustrated. In the energized condition, the electromagnet 44 entrains an armature 45 resting against it, which slides along retaining slots 46 formed on the inside of the tube 36. The helical spring 38 is thereby stressed and the tube 43, which is firmly connected to the armature 45, slides farther downwardly and thereby lowers the shaft 34 suspended in a holder 47, the shaft 34 being drawn downwardly by the gravity force of the absorber 1, which is connected to it by the parts 29, 10, 9, 8 and 7. A stop 48 limits the travel of the armature 45 upwardly during shut-off. A gas seal 49 prevents radioactively contaminated gases from escaping from the reactor. The lead screw 39 is turned by an electric motor 52 which operates through a reduction gear 50 and an overload clutch 51, of conventional construction and therefore not further described in detail. The overload clutch 51 prevents the drive mechanism from being damaged in the event of jamming of the linkage. The universal-joint shafts 28 and 31 are constructed at the upper end thereof so that they can be rotated, for example, by means of a wrench. The upper part of the entire device is secured in a holder plate 54.

The traction device forms one unit during normal operation, but in the event of the reactor cover having to be rotated or lifted off for maintenance work, is divisible into a lower part (connecting device 7, tie rod 8 lower half of bayonet coupling 9) and an upper part (upper half of bayonet coupling 9, connecting rod 10, chuck 29, shaft 34, holder 47, tube 43 and armature 45). The parts linking the absorber to the spring 38 which are set in motion when rapid shut-off is triggered include connection device 7, tie rod 8, bayonet coupling 9, connecting rod 10, chuck 29, shaft 34 holder 47, tube 43 and armature 45.

Referring to FIG. 5, the bayonet coupling 9 comprises an upper part 55 and a lower part 56 detachably connected to each other by means of a gear coupling which is also shown in FIG. 6. The rod 10 is provided with segments 58 which can engage appropriately shaped recesses 59 of the lower coupling part 56. FIG. 6 shows the coupling in disengaged condition whereby the rod 10 and thus segments 58 and the upper part 55 of the coupling can be pulled away in an upward direction. When the rod 10 is rotated 90 degrees, segments 58 engage the recesses 59 and lock the coupling parts 55 and 56 with respect to each other, and their mutual gearing prevents the rotary movement of the rod 10 from being transmitted to the lower coupling part 56 and to the remaining parts 1, 7, 8 of the device suspended thereon.

A Part 60 is provided at its upper end with an internal hexagon opening for accomodating a hexagon part 57 so that the rotary movement of the rod 10 can be transmitted to the part 60. The part 60 is provided with two flanges 61, 62 which, in the illustrated embodiment, each comprise three control slots 63 as shown in FIG. 7. Inside the control slots, are disposed glide pins 64, which have latches 65 attached thereto and which, at an appropriate position of the pins 64 in the control slots 63, as shown in FIG. 7 for example, engage the openings 66 in the guide tube 2.

The operation of this latch system and the bayonet coupling 9 is coupled that upon rotation of the rod 10 for releasing the coupling parts 55 and 56 from each other, segments 58 emerge from recesses 59 thereby releasing the coupling and this same rotation shifts, simultaneously, part 60 and thereby the guide slots 63 in such a manner that the latches 65 engage the opening 66. As a result, coupling parts 55 and 56 which are geared with each other, as well as the hexagon part 57 and part 60 are released from one another, through a simple pulling upwardly of the rod 10 while the absorber 1 remains securely locked in its disconnected position.

The high temperatures prevailing in the fission zone of the reactor, the radiation stress, and possible interferences make the pull rod 8 particularly susceptible to danger of being damaged. To insure that, in any event, the absorber 1 will be pulled into the core region, the upper and lower end parts of the pull rod 8 (FIG. 5 shows only the upper end part 67) are so arranged that a wire rope 69, whose ends are provided with ball-shaped holders 68, can be guided in the interior of the hollow pull rod 8 as a reserve pulling member.

FIG. 8 shows how the individual parts of the absorber 1 are connected by means of joints which consist of meshing extension sections or bulges 70 and 71 which are disposed at various locations. The individual parts of the absorber 1 are limited by stops, 72, 73 and can be shifted relative to each other, to a certain degree and especially, may be tilted, canted, and twisted oppositely relative to each other so that absorber 1 can also follow through guide tube 2 which becomes curved due to a disruption or the like.

The operation of the device is as follows:

When rapid shut-off is triggered, the electromagnet 44 ceases to carry current and releases the armature 45 which is forced upwardly by the stressed helical spring 38 to the stop 48 and thereby entrains the tube 43. The shaft 34 suspended in the mounting 47 is also forcibly pulled upwardly and, in turn, pulls up the chuck 29, the rod 10, the bayonet coupling 9, the tie rod 8 and the fastening device 7 and thereby draws the absorber 1 into the reactor core region. Simultaneously, the electric motor 52 is started up and pulls up the disc 41 through the reduction gear 50, the overload clutch 51 and the lead screw 39 and thereby forcibly entrains the armature 45, in case the latter should not have been impelled to its upper rest position.

After correcting the reactor trouble which caused the aforedescribed rapid shut-off, the operational readiness of the device is restored as follows:

The electric motor 52 is driven in the opposite rotary direction, and through the lead screw 39, causes a lowering or unscrewing of the nut 40, and the disc 41 and the electromagnet 44, which is simultaneously energized and thereby entrains the armature 45 downwardly against the biasing force of the helical spring 38. The tube 43 and the holder 47 connected thereto, are thereby moved downwardly, so that, due to the force of gravity, the absorber 1 which is suspended on it by means of the parts 34, 29, 10, 9, 8 and 7 slides downwardly out of the reactor core region, until the lowermost member of the absorber 1 rests in the end section 5 of the guide tube 2, thereby terminating the shut-off of the reactor.

To disengage the bayonet coupling 9, the universal joint shaft 31 is rotated, imparting its rotation through the pinion 32 to the gear 33, and through the latter to the shaft 34 which, in turn, sets the connecting rod 10 in rotation through the chuck 29, and thereby initiates the coupling operation.

The rotation of the universal-joint shaft 28, through the pinion 27 and the gear 26, causes rotation of the sleeve 25 which, through the gear coupling 24, turns the tube 23 and the nut 21 in which the sleeve 20 is screwed and which is fastened in the tube 23. The tube 17 connected to the sleeve 20 rises and entrains the centering tube 6, whereby the latter's connection to the guide tube 2 is released and a gap between these two tubes 6 and 17 is formed. After disengagement of the bayonet coupling 9, the reactor lid, with the parts of the device built into the same, is then rotatable, while the parts 1 to 5, 7 and 8 remain fixed in the reactor.

I claim:

1. In a nuclear reactor of the type having an elongated tube for guiding an absorber, a control rod mechanism having raised and lowered positions for rapidly and safely shutting off the nuclear reactor comprising, a flexible absorber guided in said tube for movement between a raised shut-off and a lowered position, a connecting means suspending said absorber within said elongated tube, spring means operatively connected to said connecting means, a drive mechanism connected for compressing said spring means and lowering the absorber release means for releasably holding said spring means in said compressed condition wherein release of said spring means causes the latter to effect accelerating vertical displacement of said connecting means and absorber to the raised position of the absorber and means for disposing said spring means, drive mechanism and release above said elongated tube.

2. A control rod mechanism according to claim 1 comprising means for separating a portion of said connecting means from said absorber including pin means and slot means for simultaneously locking said absorber in its raised position, the pin means mounted in slots in the lower portion of the separating means, the pins having latches, a tube connected to the absorbing means, said latches engaging openings in said tube.

3. A control rod mechanism according to claim 1 wherein said elongated tube is traversible by coolant and is formed with an open lower end section, said absorber comprising a plurality of members hinged to one another to allow their longtudinal axes to intersect at an angle, said absorber being guided in said elongated tube, the lowermost of said absorber members being receivable in said lower end section of said elongated tube said lowermost absorber member closely fitting into said lower end section in its lowered position, so as to substantially seal the bottom of said guide tube, thereby preventing the flow of coolant through said guide tube.

4. A control rod mechanism according to claim 1 wherein said connecting means has a tie rod with hollow interior containing a wire rope secured at both ends thereof.

* * * * *